US005421108A

United States Patent [19]

Stewart

[11] Patent Number: 5,421,108

[45] Date of Patent: Jun. 6, 1995

[54] HIGH VOLUME PIPE PADDING MACHINE

[75] Inventor: Teddy L. Stewart, Austin, Tex.

[73] Assignee: Capitan Trencher Corp., Austin, Tex.

[21] Appl. No.: 19,571

[22] Filed: Feb. 18, 1993

Related U.S. Application Data

[63] Continuation-in-part of Ser. No. 765,537, Sep. 25, 1991, abandoned.

[51] Int. Cl.[6] ........................... E02F 5/22; B07B 1/46; F16L 1/028

[52] U.S. Cl. ..................................... 37/142.5; 37/360; 37/362; 37/464; 209/421; 209/678; 405/179

[58] Field of Search ...................... 37/142.5, 360, 361, 37/362, 357, 358, 355, 97, 107, 105, 104, 464, 463, 412; 405/179; 104/2; 171/16, 126, 127, 130, 132; 209/311, 315, 325, 331, 346, 675, 421, 678

[56] References Cited

U.S. PATENT DOCUMENTS 111,604 2/1871 Bailey .
123,479 2/1872 Hooton .
863,319 8/1907 Schnell et al. .................... 37/355 X
1,004,715 10/1911 Valiquett et al. .
1,658,398 2/1928 Seaman .
1,677,342 7/1928 Hodgen .
1,721,392 7/1929 Heumann .
1,721,587 7/1929 Burchill .
1,972,385 9/1934 Hutton .
2,107,532 2/1938 Hallenbeck .
2,270,703 1/1942 Bernard .
2,602,388 7/1952 Elliott et al. .
2,694,499 11/1954 Mohrlang et al. .
2,696,287 12/1954 Foust .
2,814,387 11/1957 McWilliams .
2,857,691 10/1958 Curran .
2,931,529 4/1960 Osterhaus .
2,947,096 8/1960 Cummings et al. .
2,968,879 1/1961 Rusich .
3,012,371 12/1961 Pawela .
3,012,615 12/1961 Pawela .
3,181,258 5/1965 Duncan .
3,224,120 12/1965 Wilmoth et al. .
3,314,175 4/1967 Petty et al. .
3,316,977 5/1967 Snook ............................ 209/421 X
3,332,249 7/1967 Idoine .
3,396,481 8/1968 Hovorak .
3,402,816 9/1968 Taylor .
3,431,741 3/1969 Kinnan .
3,439,806 4/1969 Kass et al. .
3,443,836 5/1969 Poltavtsev et al. .
3,446,026 5/1969 Fikse .
3,471,953 10/1969 Wyatt .
3,479,755 11/1969 Schropp .
3,507,060 4/1970 Gee .
3,511,056 5/1970 Jones et al. .

(List continued on next page.)

*Primary Examiner*—Dennis L. Taylor
*Assistant Examiner*—Andrea Chop
*Attorney, Agent, or Firm*—Richards, Medlock & Andrews

[57] ABSTRACT

A padding machine (10, 100) which is capable of separating materials in a spoils bank beside a trench into coarser materials, which are redeposited in the spoils bank behind the machine, and finer materials which are conveyed to the trench for padding the pipeline. The machine includes a conveyor with a conveyor chain which moves around the perimeter of the machine. Material caught by the scraper blade (28) is conveyed by the conveyor chain along a belly pan (70) and thereafter over a plurality of grizzly bars (72). Coarser material which will not pass through the grizzly bars is conveyed by the conveyor chain (56) to the rearward end of the machine and dumped off the rearward end of the machine back to the ground. The finer materials passing through the grizzly bars are again separated by a vibrator unit (76, 104). The depth of the scraper blade can be adjusted by pivoting the entire frame about the wheels (34) at the rearward end of the frame by a hydraulic cylinder (48) pivoting the towing arm (38). A padding machine (120) is also disclosed which does not use a scraper blade (28), but relies on flights (88) to move material.

10 Claims, 6 Drawing Sheets

U.S. PATENT DOCUMENTS 3,583,168 6/1971 Horton .
3,596,384 8/1971 Neujahr .
3,597,927 8/1971 Hemphill .
3,670,909 6/1972 Holland .
3,701,422 10/1972 Downey .
3,767,030 10/1973 Briggs et al. .
3,797,582 3/1974 Couch .
3,841,410 10/1974 Nikitin et al. .
3,851,342 12/1974 Moore .
3,874,182 4/1975 Potter et al. .
3,903,624 9/1975 Holl .
3,908,292 9/1975 Harris .
3,934,363 1/1976 McMurray .
3,978,673 9/1976 Schleede .
3,981,089 9/1976 Burrows .
4,013,518 3/1977 Miko .
4,055,255 10/1977 Vasquez .
4,055,265 10/1977 Eisenman .
4,057,917 11/1977 Burrows .
4,068,488 1/1978 Ball .
4,116,014 9/1978 Satterwhite .
4,160,457 7/1979 Dickson, Jr. et al. .
4,200,236 4/1980 Briar .
4,221,505 9/1980 Taylor-Smith .
4,225,362 9/1980 Sentell .
4,232,982 11/1980 Satterwhite .
4,279,051 7/1981 Malcolm .
4,290,820 9/1981 Swisher, Jr. et al. .
4,301,910 11/1981 Price .
4,330,968 5/1982 Kobayashi et al. .
4,343,389 8/1982 Ponstein .
4,363,725 12/1982 Morita et al. .................. 209/421 X
4,377,365 3/1983 Layh .
4,539,765 9/1985 Reece .
4,591,432 5/1986 Hartl .
4,616,957 10/1986 Burrows et al. .
4,633,602 1/1987 Layh .
4,640,364 2/1987 Theurer .
4,664,791 5/1987 McClain .
4,755,001 7/1988 Gilbert .
4,789,068 12/1988 Gilmore .
4,812,078 3/1989 Rivard .
4,861,461 8/1989 Utterback .
4,864,748 9/1989 Boyer .
4,912,862 4/1990 Bishop et al. .
4,912,862 4/1990 Bishop et al. .
4,948,299 8/1990 Cronk, Jr. et al. .
4,955,756 9/1990 Klamar .
5,009,548 4/1991 Falbo .
5,097,610 3/1992 Bishop ............................ 405/179 X
5,120,433 6/1992 Osadchuk .
5,292,006 3/1994 Girts, Jr. ......................... 209/315 X

FOREIGN PATENT DOCUMENTS 559127 9/1923 France .............................. 37/142.5
958552 3/1950 France ................................. 171/16
7246 4/1921 Netherlands .
1419628 9/1972 United Kingdom .
1361611 7/1974 United Kingdom .
1553667 10/1979 United Kingdom ................ 209/421
777158 11/1980 U.S.S.R. ............................... 37/412

HIGH VOLUME PIPE PADDING MACHINE

CROSS REFERENCE TO RELATED APPLICATIONS

This application is a continuation-in-part of U.S. application Ser. No. 765,537, filed Sep. 25, 1991, now abandoned.

TECHNICAL FIELD OF THE INVENTION

This invention relates to the technology of installing a pipeline in a trench, and in particular to separating the spoils bank beside the trench into fine material for padding the pipeline as the trench is filled in.

BACKGROUND OF THE INVENTION

There are a great many underground pipelines in use today and many more are predicted for installation in the future. When a pipeline is laid in a trench or ditch, whether it be an initial installation of the pipeline, or a reinstallation of the pipeline after recoating or other treatment, the trench must be filled in about the pipeline. Naturally, the operator must be careful not to drop large boulders or rocks on the pipeline when filling the trench for fear of damaging the pipeline. It is therefore common to initially cover the pipeline, to a depth of perhaps a foot, with padding material, which is normally just the finer materials removed when the trench was dug. After a padding layer is in place about the pipeline, larger rocks and boulders can then be used to fill the trench without fear of damaging the pipeline.

In excavating a trench, it is common to build up the material removed from the trench in a spoils bank on one or both sides (sometimes called the right of way) of the trench which runs the length of the trench. Normally, the spoils bank will be a homogeneous mix of finer materials, intermediate materials, and larger materials like boulders or rocks.

Over the years, a number of devices have been developed for segregating the spoils by size and dumping the finer materials into the trench to pad the pipe, with the remaining materials sometimes added subsequently to fill in the trench. U.S. Pat. No. 3,701,422 issued to Downey on Oct. 31, 1972, illustrates a modified road grader which is capable of segregating materials by size and conveying the finer materials over the ditch to pad the pipeline. U.S. Pat. No. 4,633,602 issued to Layh, et al. on Jan. 6, 1987, discloses a method and apparatus for padding pipe. This patent discloses a machine which is self-propelled along the spoils bank which segregates material by size and delivers the finer materials to the pipeline for padding while discharging the coarser materials behind the machine. U.S. Pat. No. 4,955,754 to Klamar issued on Sep. 11, 1990, discloses yet another pipeline padding system. In this system, the segregating device is suspended over the pipeline and moved along the pipeline. The device segregates the material, dropping the finer materials on the pipeline first, and then sequentially dropping medium size and larger size materials in the trench thereafter.

Despite the efforts in the technology to perform the padding operation with greater efficiency and economy, a need still exists for a padding machine which is more effective, less expensive and reliable in operation.

SUMMARY OF THE INVENTION

In accordance with one aspect of the present invention, a padding machine is provided for separating material in a spoils bank beside a trench by size and supplying the fine sized material to pad a pipeline in the trench. The machine includes a frame having a forward end and a rearward end. A wheel assembly is mounted on the frame at the rearward end of the frame with the wheel assembly having at least one wheel in contact with the ground and rotating about a first axis. A scraper blade is mounted on the frame at the forward end. A towing arm is pivoted to the frame at the forward end with the towing arm having a front end for attachment to a towing vehicle. Structure is provided for pivoting the towing arm relative the frame to pivot the frame about the first axis to set the position of the scraper blade relative to the material in the spoils bank.

In accordance with another aspect of the present invention, a padding machine is provided for separating material in a spoils bank beside a trench by size and supplying fine sized material to pad a pipeline in the trench. The padding machine includes a frame having a forward end and a rearward end. A continuous conveyor is mounted on the frame for movement about the perimeter of the frame. A plurality of grizzly bars are mounted on the frame beneath a portion of the conveyor so that material conveyed will fall through the grizzly bars if it is a size smaller than the spacing between the grizzly bars. The large material not passing through the grizzly bars is carried over the grizzly bars by the conveyor to the rearward end of the frame where it falls to the ground behind the machine. Finer materials falls through the grizzly bars.

In accordance with another aspect of the present invention, separating structure is provided beneath the grizzly bars for separating the material falling through the grizzly bars into intermediate and fine materials. A second conveyor is utilized for conveying the fine materials to the trench for padding the pipeline.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION

Figure 1:
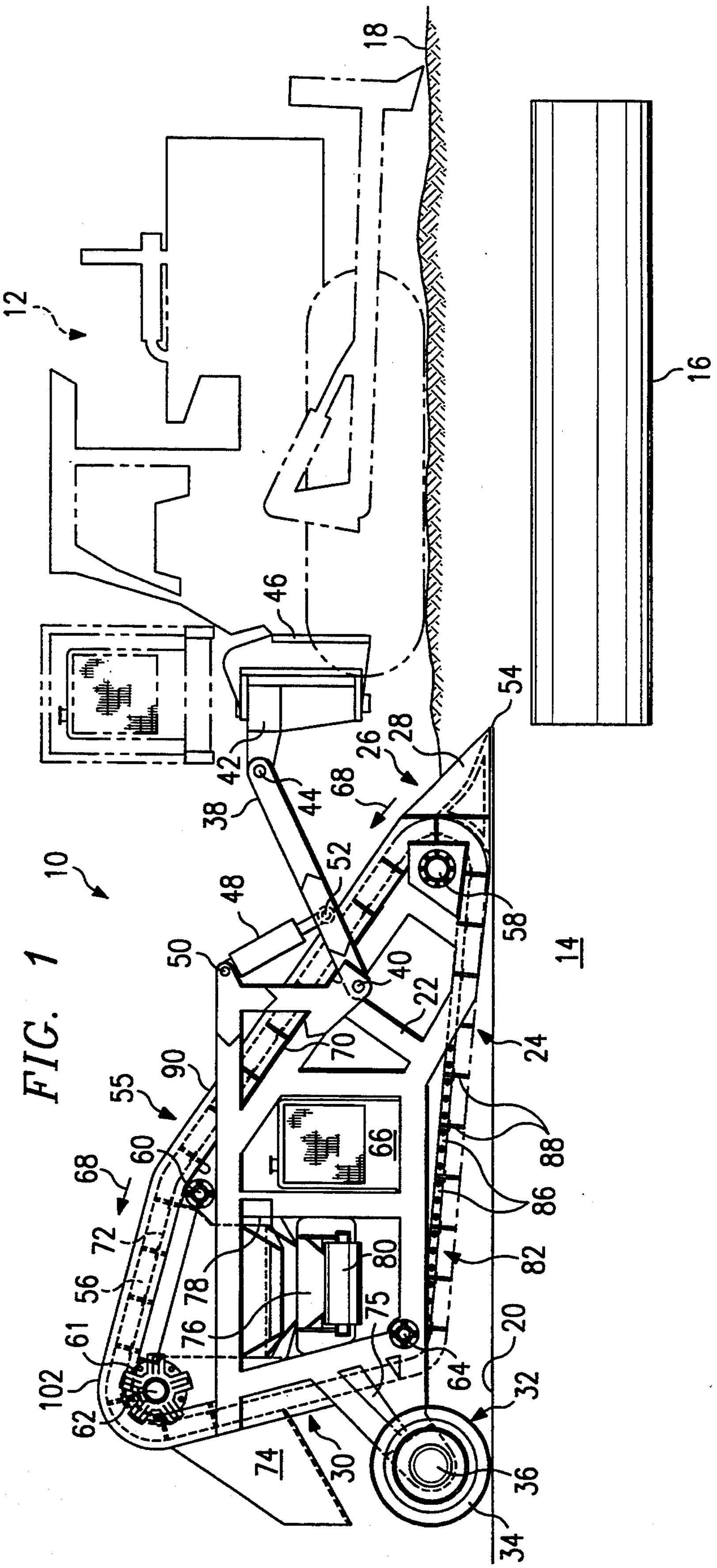
FIG. 1 is a side view of a padding machine forming a first embodiment of the present invention.
Figure 2:
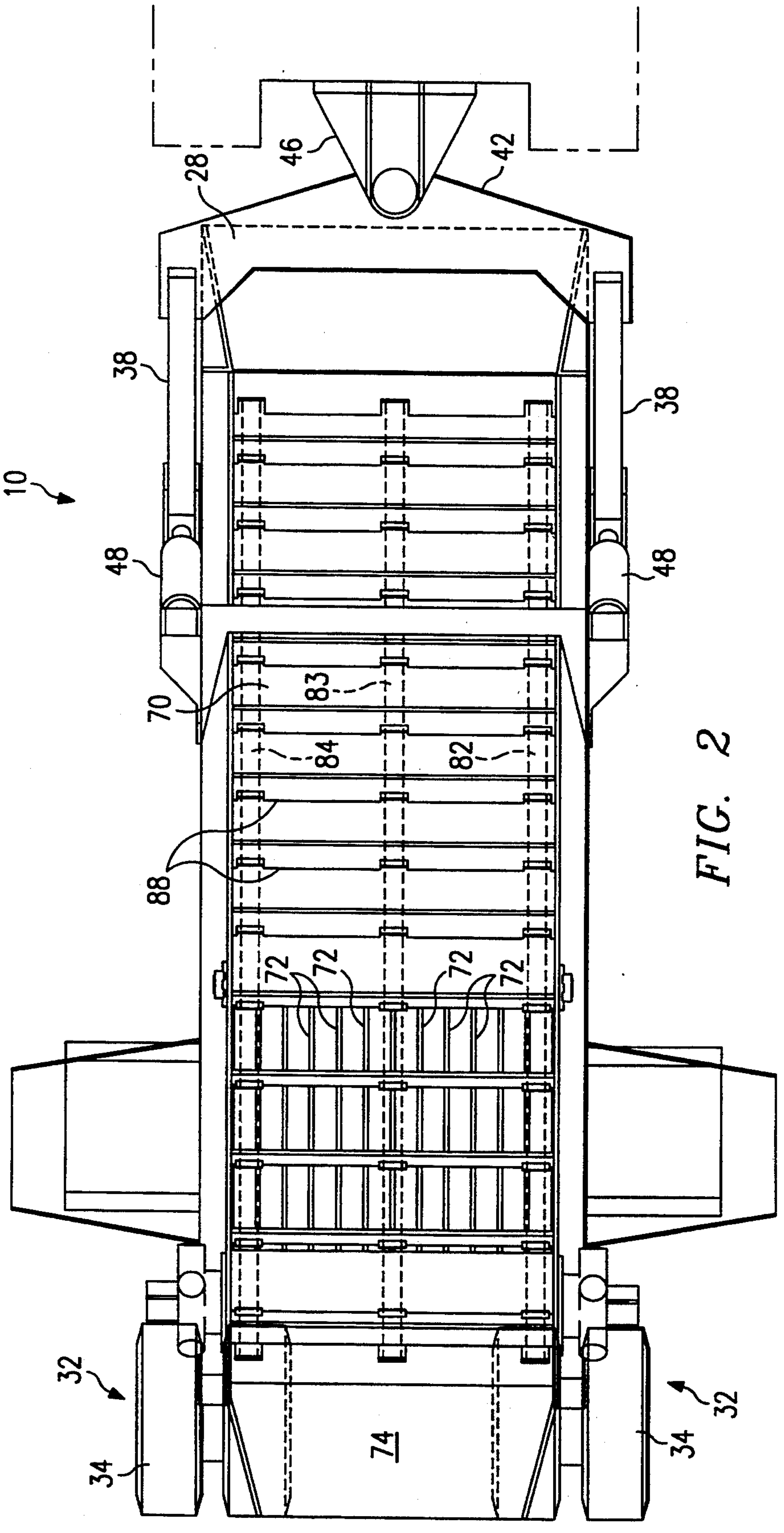
FIG. 2 is a plan view of the padding machine.

With reference now to the accompanying drawings, and in particular to FIGS. 1 and 2, a padding machine 10 is illustrated which forms a first embodiment of the present invention. The padding machine 10 is designed to be towed behind a tractor 12 beside a trench 14 containing a pipeline 16. The machine is driven through the spoils bank 18 which is formed on the ground 20 on at least one side of the trench 14. The spoils bank 18 is created by digging the material out of the trench 14 to expose the pipeline 16 for repair, or to dig the trench for installation of the pipeline. As noted previously, the spoils bank 18 is a relatively homogeneous mixture of fine materials such as dirt, pebbles and small rocks, intermediate materials including larger rocks and large materials including rocks and boulders. The purpose of the padding machine is to separate the spoils in the bank 18 and pad the pipeline with the finer materials like dirt, pebbles and small rocks.

As seen in FIG. 1, the machine 10 includes a frame 22 which defines a perimeter 24. At a front end 26 of the frame is mounted a scraper blade 28. Scraper blade 28 is preferably similar to a Caterpillar® tractor style scraper blade such as used on Caterpillar® tractors.

At the rearward end 30 of the machine 10 is mounted a wheel assembly 32. Wheel assembly 32 preferably mounts two wheels 34 for rotation about an axis 36. As will be discussed hereinafter, only the scraper blade 28 and the wheels 34 are intended to contact the ground or spoils bank.

A towing arm 38 is pivoted at one end to frame 22 at pivot 40. The opposite end of the towing arm 38 is pivoted to an attachment member 42 at pivot 44. The attachment member 42 is designed to be attached to a mounting trunion 46 on the tractor 12. For example, a Model D8 Caterpillar® tractor can be used to tow the machine 10.

A double acting depth adjustment hydraulic cylinder 48 is pivoted at one end to the frame 22 at pivot 50 and at the other end to a pivot 52 on the towing arm 38 intermediate the pivots 40 and 44. Hydraulic fluid under pressure can be provided to the hydraulic cylinder 48 to shorten or lengthen the cylinder as desired. As can be seen from the geometry of the cylinder 48, towing arm 38 and frame 22, adjusting the length of the cylinder will cause the entire machine 10 to pivot about the wheels, and specifically axis 36, relative to the tractor 12 and to the ground. In this manner, the position of the tip 54 of the scraper blade 28 can be set to a desired depth in the spoils bank 18. If the depth is set too shallow, an insufficient quantity of spoils material will be caught by the blade as the tractor tows the machine along the right of way to pad the pipe. If the scraper blade is set too deep in the spoils bank 18, too much material will be supplied.

A conveyor 55 is mounted about the perimeter 24 of the frame 22 to carry the material caught by the scraper blade 28 for separation. The conveyor 55 includes a continuous conveyor chain 56. The conveyor chain is constrained about a front idler roller 58, an intermediate idler roller 60, the drive sprocket 61 of a drive motor 62 and a rear idler roller 64. A hydraulic power unit 66, including an engine and a hydraulic pump, is mounted within the frame 22 to supply hydraulic fluid under pressure to the motor 62 to drive the conveyor chain in the direction of arrow 68. The power unit 66 also supplies hydraulic fluid under pressure to the cylinder 48. As can be seen, as the conveyor chain 56 is moved in the direction of arrow 68, spoils material from the spoils bank 18 caught by the scraper blade 28 will be conveyed upward along the top of the frame 22. Underlying a portion 90 of the conveyor 55 is a wear-resistant conveyor belly pan 70 which prevents the material caught by the scraper blade 28 from falling through the frame 22. The belly pan ends at approximately the intermediate roller 60 and thereafter, under the next portion 102 of the conveyor 55, is a series of grizzly bars 72 which extend parallel to the direction of motion of the conveyor chain 56 and are set a predetermined distance apart from one another. In the preferred embodiment, the bars are set $3\frac{1}{2}$ inches apart. Also, the grizzly bars 72 are preferably mounted to the frame so that the separation between the bars can be easily changed if the operator wishes to allow larger materials to pass through the bars, by increasing the separation, or to pass only finer materials by decreasing the separation.

Smaller material conveyed along the conveyor chain 56 to the portion overlying the grizzly bars will fall through the grizzly bars for further separation. Larger material, specifically large rocks and boulders, will not be able to pass through the grizzly bars and will be conveyed by the conveyor chain 56 to the rearward end of the frame 22. As the conveyor chain 56 turns the corner about the drive motor 62 and begins the portion of travel descending to the rear idler roller 64, the larger material will fall off the conveyor chain 56 and onto the ground behind the machine 10. Preferably, a large spoil dump chute 74 is mounted to the rearward end of the frame 22 to guide the material over the wheel assembly 32.

Mounted beneath the grizzly bars 72 in the frame 22 is a screen vibrator unit 76. The unit 76 preferably has at least two size screens, one above the other, for further separation of the material falling through the grizzly bars. In accordance with one aspect of the present invention, the first screen is formed by a square mesh having openings of $2\frac{1}{2}$ inches and the screen below that is a series of parallel tensioned piano wire having a separation of $\frac{3}{4}$ inches. The vibrator unit 76 can be vibrated by a vibrator 78 to assist the separation action. The intermediate sized material not passing through either of the screens falls to the rear of the screen and onto a chute 75 to fall back on the right of way. The fine material passing through the lower screen in the vibrator unit 76 is dumped on a second conveyor 80 which conveys the fine material over to the pipeline 16 and dumps the material on the pipeline 16 for padding.

Referring to FIG. 2, the conveyor chain 56 is formed of three identical parallel chains 82, 83 and 84 each formed of individual links 86. Suspended between the chains 82 and 84 at uniform intervals are board shaped flights 88 which extend perpendicular the direction of movement of the conveyor chain. As can be understood, if the belly pan 70 was not in position beneath the conveyor chain along the portion 90, the material would simply fall through the frame. Alternatively, fabric or other materials could be substituted for chains 82, 83 and 84. Also, a fabric or rubber belt could be used instead of the chains with flights directed from the belt toward the belly pan and bars 72 if the material is conveyed between the belt and belly pan 70 from the scraper blade to the grizzly bars, and between the belt and bars 72. As noted previously, when the material is conveyed past the end of the belly pan 70 and over the grizzly bars 72, all but the largest material will fall through the conveyor chain 56 and grizzly bars 72 onto the vibrator unit 76.

Figure 3:
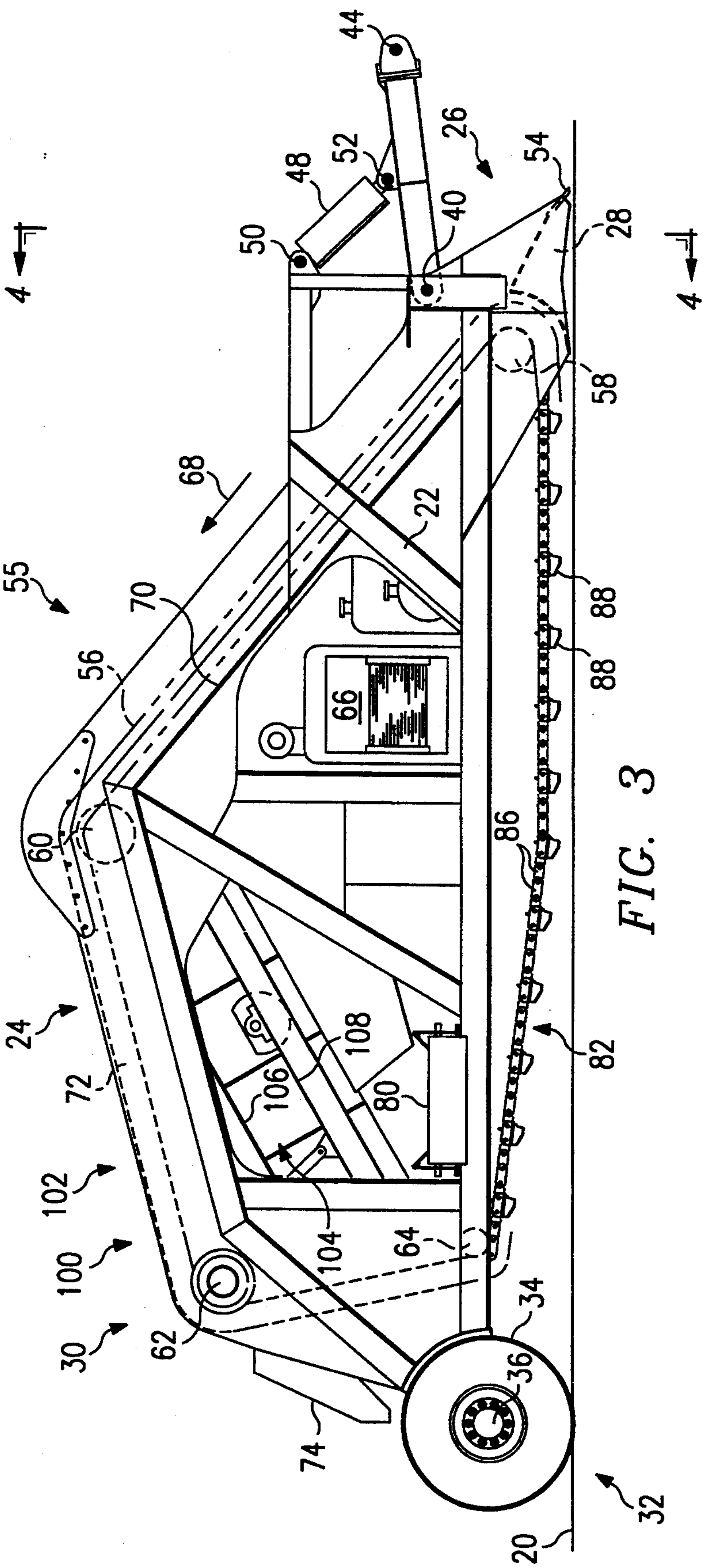
FIG. 3 is a side view of a padding machine forming a second embodiment of the present invention.
Figure 4:
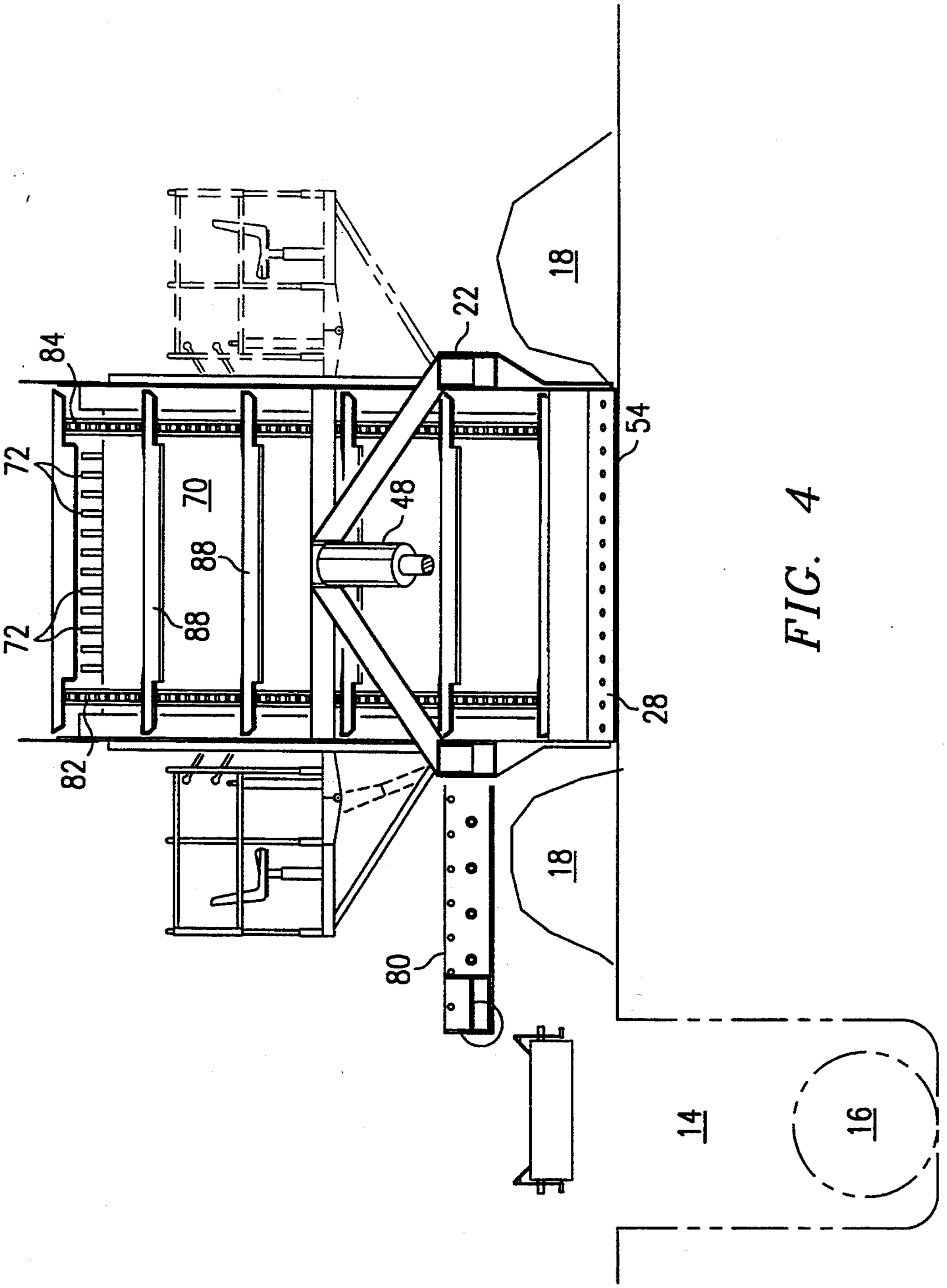
FIG. 4 is a front view of the padding machine of FIG. 3.

With reference now to FIG. 3, a padding machine 100 forming a second embodiment of the present invention will be described. Many elements of the machine 100 are identical to that in machine 10, and are identified by the same reference numerals. However, in machine 100 the portion 102 of the conveyor chain 56 is set at a descending angle from the intermediate idler roller 60 to the rearward end of the frame 22. This angle assists the movement of the larger materials which cannot pass through the grizzly bars to the rearward end of the machine where they are dumped on the right of way behind the machine 10. Also, a screen vibrator unit 104 is mounted on the frame which is tilted at a descending angle from the forward end of the frame to the rearward end of the frame as well. The screen vibrator unit 104 also has an intermediate screen 106 and a fine screen 108 beneath the intermediate screen 106. Materials falling through the grizzly bars 72 will fall onto the intermediate screen 106. Materials too large to pass through the intermediate screen 106 will fall by gravity toward the rearward end of the frame where they fall off the end of the screen onto the right of way behind the machine. Materials passing through the screen 106 will fall onto the fine screen 108. Materials too large to pass through the fine screen 108 will also fall by gravity to the rearward end of the machine where they also just fall off the end of the screen and are dumped behind the machine on the right of way. Only the finest material, having passed through the grizzly bars, screen 106 and screen 108 will fall onto the second conveyor 80 for conveyance to the pipeline.

In one device constructed in accordance with the teachings of the present invention, the screen vibrator unit is a unit sold by Power Screen Company of La-Grange, Tex. as a 5 feet by 10 feet screening vibrator box. The intermediate screen 106 is formed of a square mesh having a spacing of 2½ inches apart. The fine screen 108 is formed of parallel tensioned piano wire with a separation of ¾ inch between each parallel wire. The screen vibrator unit 104 is preferably set at an angle of 30° from the horizontal. Further, the separation of the grizzly bars 72 is preferably made adjustable and the length of the grizzly bars in the machine made in accordance with the teachings of the present invention is 12 feet.

A number of advantages exist in the present design over that known previously. In the present design, a conveyor drives the material over the grizzly bars. This provides a positive action to drive large materials over the grizzly bars and off the rear end of the machine back on the right of way. This avoids clogging or building up of material on the grizzly bars which can prevent the finer materials from freely passing through the grizzly bars. The positive movement of material over the grizzly bars also resists the passage through the bars of material which has a single dimension small enough for passage through the bars and onto the screens below, possibly damaging the screens. When not positively driven, such materials could lie atop the grizzly bars for a sufficient period of time to be bounced to an orientation to pass through the bars and impact on the screen. Further, the pivoting of the entire frame about the wheels 34 to adjust the cutting depth of the scraper blade 28 provides an improved mechanism over that previously known. Previous devices have been forced to have a pivotal appendage or head, such as the Layh U.S. Pat. No. 4,633,602, or to divide a frame into two pivoting portions.

Figure 5:
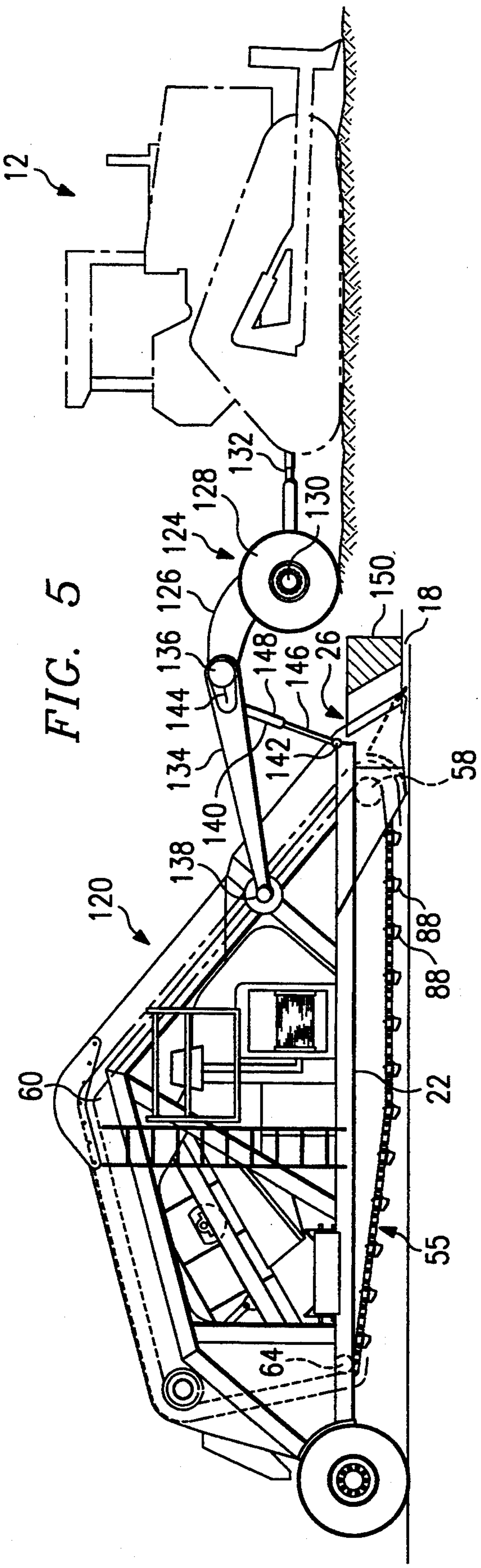
FIG. 5 is a side view of a padding machine forming a first modification of the present invention.
Figure 7:
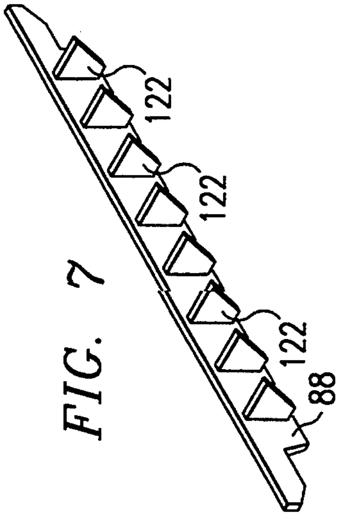
FIG. 7 is a perspective view of the flight of the padding machine illustrating teeth thereon.
Figure 6:
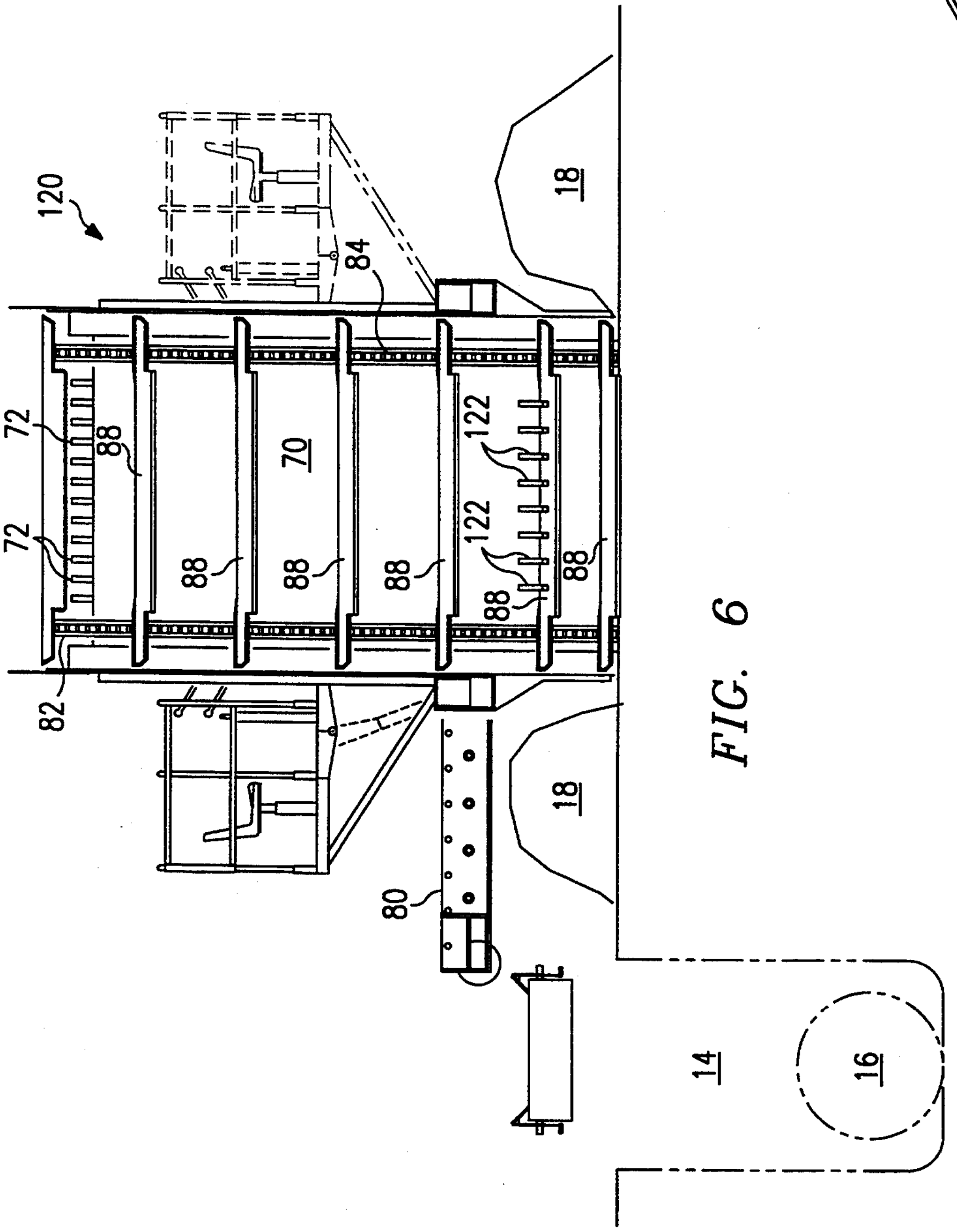
FIG. 6 is an end view of the padding machine of FIG. 5.

A padding machine 120 forming a modification of the prior described machines is illustrated in FIGS. 5–7. Many elements of padding machine 120 are identical to those described previously in padding machines 10 and 100, and these are identified by the same reference numeral.

In padding machine 120, the front end 26 of the machine has no blade. The machine 120 is designed so that the flights 88 on the conveyor 55 engage the spoils bank 18 between the rear idler roller 64 and the front idler roller 58. The movement of the conveyor and flights 88 in this portion of the conveyor path is toward the front end of the machine. The flights 88 will dig into the spoil bank and convey the spoils forward to the front end of the machine where the flights cause the spoil to move onto the portion of the conveyor extending between the front idler roller 58 and the intermediate idler roller 60. Because the height of each flight is limited, perhaps two inches, each flight will dig into the spoils bank only to a depth corresponding to the height of the flight. This controls the quantity of material that the padding machine 120 processes and prevents the padding machine from becoming bogged down or overwhelmed by the material to be separated. Occasionally, the blade 28 of padding machine 10 can dig too deeply into the spoil bank, causing a sharp increase in the towing force necessary to pull the padding machine along the spoil bank, and possibly even stalling the machine if the force becomes excessive.

The flight 88 illustrated in FIG. 7 is provided with optional forward extending teeth 122 which assist the flights in engaging the spoils in the spoils bank. It can be readily understood that many different configurations and sizes of teeth would be suitable for this function.

Padding machine 120 also uses a front wheel assembly 124 which is mounted between the tractor 12 and the front end of frame 22. The wheel assembly 124 includes a frame 126 which mounts one or more wheels 128 thereon for rotation about an axis 130. The frame 126 is connected to the rear of the tractor 12 at attachment point 132. The frame 126 mounts one end of towing arm 134 at pivot 136. The other end of towing arm 134 is pivotally mounted to the frame 22 at pivot 138. A hydraulic cylinder 140 is mounted to the front end 26 of the frame 22 at pivot 142 and to the towing arm 134 near frame 126 at pivot 144. Thus, the vertical position of the front end 26 of the frame 22 can be varied by extending or retracting the piston 146 within the cylinder 148. The wheel assembly 124 provides support for the front end 26 of the frame 22 in the desired vertical position.

A drag or sweep 150 can be mounted at the front end 26 of the frame 22 to help gather the spoil material into the conveyor 55.

The padding machine 120 has numerous advantages. The machine 120 can be used to excavate into virgin ground up to two feet depth or any lesser depth with good control. This will allow padding or top soil to be removed from the working side of the right of way and relocated.

The padding machines described above also have the advantage of being pulled, not self propelled. This prevents the tying up of additional equipment when not needed. The use of the flights 88 force feeds the material over the grizzly bar system, thus, wet material can be readily processed. The self-leveling feature of the machine provided by use of rear wheel assembly 32 and front wheel assembly 124 stabilizes the machine when working over an uneven spoil pile. The fine screen of each padding machine can be made up of piano wire screen. This allows a finer gradation of material and less clogging with roots and the like. Further, the conveyor speed can be varied. The speed of the flights 88 can therefore be selected to gather the proper amount of material for most efficient operation of the padding machine by accommodating material weight deviations. It will be expected that the padding machines can operate to separate a quantity of material within the range of 230 yards per hour up to 800 yards per hour of separation.

Although several embodiments of the invention have been illustrated in the accompanying drawings and described in the foregoing detailed description, it will be understood that the invention is not limited to the embodiments disclosed, but is capable of numerous rearrangements, modifications and substitutions of parts and elements without departing from the spirit and scope of the invention.

I claim:

1. A padding machine for separating material beside a trench by size and supplying fine size material to pad a pipeline in the trench, comprising:
- a frame having a forward end, a rearward end, an upper side and an underside;
- a wheel assembly mounted on the frame at the rearward end thereof, the wheel assembly having at least one wheel in contact with the ground and rotational about a first axis;
- a towing arm pivoted to said frame at the forward end thereof, the towing arm having a front end for attachment to a towing vehicle;
- a continuous conveyor mounted on the frame and having a moving conveyor element for movement about a perimeter of the frame, the conveyor element having a first portion moving from the rearward end of the frame to the forward end of the frame at the underside of the frame, the first portion of said conveyor element having at least one member to engage the material and convey the material to the forward end of the machine for separation;
- a belly pan underlying a second portion of the conveyor extending from the front end of the frame rearward in the frame along the upper side of the frame for carrying material engaged by the conveyor element along the conveyor;
- a plurality of grizzly bars underlying a third portion of the conveyor rearward of the belly pan, finer material in the material conveyed by the conveyor falling through the grizzly bars, coarser material incapable of falling through the grizzly bars being conveyed by the conveyor off the rearward end of the frame for deposit on the ground;
- separating means mounted on the frame beneath the grizzly bars for separating the material falling through the grizzly bars into coarser and finer materials; and
- a second conveyor for conveying the finer materials to the trench to pad the pipeline.

2. A padding machine for separating material beside a trench by size and supplying fine size material to pad a pipeline in the trench, comprising:
- a frame having a forward end, a rearward end, an upper side and an under side;
- a wheel assembly mounted on the frame at the rearward end thereof, the wheel assembly having at least one wheel in contact with the ground and rotational about a first axis;
- a towing arm pivoted to said frame at the forward end thereof, the towing arm having a front end for attachment to a towing vehicle;
- a continuous conveyor mounted on the frame and having a moving conveyor element for movement about a perimeter of the frame, the conveyor element having a first portion moving from the rearward end of the frame to the forward end of the frame at the under side of the frame, the first portion of said conveyor element having at least one member to engage the material and convey the material to the forward end of the machine for separation;
- the conveyor element being a fabric belt.

3. A padding machine for separating material beside a trench by size and supplying fine size material to pad a pipeline in the trench, comprising:
- a frame having a forward end, a rearward end, an upperside and an underside, the frame further having a perimeter;
- a conveyor mounted on the frame about the perimeter of the frame having a movable conveyor element for movement about the perimeter of the frame;
- a belly pan mounted on the frame beneath a first portion of the conveyor extending from the forward end rearward in the frame, material caught by the conveyor being conveyed along the belly pan by the conveyor;
- a plurality of grizzly bars underlying a second portion of the conveyor, finer materials conveyed along the belly pan by the conveyor falling through the grizzly bars, coarser materials incapable of passing through the grizzly bars being conveyed by the conveyor to the rearward end of the frame where the coarser materials fall off the frame onto the ground;
- a plurality of members mounted on the conveyor element, the conveyor having a third portion extending from the rearward end to the forward end of the frame on the underside of the frame, said members engaging the material to be separated and conveying the material to the forward end of the machine where the material is conveyed along the first portion of the conveyor.

4. The padding machine of claim 3 further comprising a second conveyor for conveying materials passing through the grizzly bars to the trench for padding the pipeline.

5. The padding machine of claim 4 further comprising a vibrator unit mounted on the frame beneath the grizzly bars for separating the material falling through the grizzly bars into coarser and finer materials, the finer materials being conveyed to the trench by said second conveyor.

6. The padding machine of claim 3 wherein the separation between the grizzly bars is adjustable.

7. The padding machine of claim 3 wherein the conveyor element is a plurality of parallel metal chains, each chain formed of metal links, said members being flights secured between the chains at spaced intervals along the chains.

8. The padding machine of claim 3 wherein the conveyor element is a fabric belt.

9. The padding machine of claim 3 further comprising:
- a wheel assembly mounted on the frame at the rearward end of the frame, said wheel assembly having at least one wheel in contact with the ground and rotatable about a first axis;
- a towing arm pivoted to said frame at the forward end thereof;
- a forward wheel assembly having at least one wheel in contact with the ground and rotatable about a second axis, the towing arm pivoted to said forward wheel assembly; and a double-acting hydraulic cylinder for pivoting the towing arm relative to the frame and forward wheel assembly to pivot the frame about the first axis to set the position of the conveyor relative the material to be separated.

10. The padding machine of claim 3 wherein the padding machine is used for excavating virgin ground.

* * * * *